United States Patent
Liu

(10) Patent No.: US 11,317,394 B2
(45) Date of Patent: Apr. 26, 2022

(54) CORRESPONDENCE INDICATING AND DETERMINING METHOD AND APPARATUS, BASE STATION, AND USER EQUIPMENT

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 79 days.

(21) Appl. No.: 16/753,290

(22) PCT Filed: Oct. 11, 2017

(86) PCT No.: PCT/CN2017/105725
§ 371 (c)(1),
(2) Date: Apr. 2, 2020

(87) PCT Pub. No.: WO2019/071470
PCT Pub. Date: Apr. 18, 2019

(65) Prior Publication Data
US 2020/0305132 A1  Sep. 24, 2020

(51) Int. Cl.
*H04W 72/04* (2009.01)
*H04W 56/00* (2009.01)
*H04W 28/06* (2009.01)

(52) U.S. Cl.
CPC ..... *H04W 72/042* (2013.01); *H04W 56/0015* (2013.01); *H04W 28/06* (2013.01)

(58) Field of Classification Search
USPC ......................................................... 370/328
See application file for complete search history.

(56) References Cited

U.S. PATENT DOCUMENTS

2016/0212631 A1  7/2016  Shen et al.
2017/0094624 A1  3/2017  Balachandran et al.
(Continued)

FOREIGN PATENT DOCUMENTS

CN       106793058 A        5/2017
WO    WO 2016/203290 A1   12/2016
WO    WO 2017129100 A1    8/2017

OTHER PUBLICATIONS

Office Action of Indian Application No. 202047017689, dated Jun. 29, 2021.
(Continued)

*Primary Examiner* — Robert J Lopata
(74) *Attorney, Agent, or Firm* — Finnegan, Henderson, Farabow, Garrett & Dunner, L.L.P.

(57) ABSTRACT

This disclosure relates to a correspondence indicating and determining method, device, base station, user equipment, and computer-readable storage medium. The correspondence indicating method includes: determining a beam to be sent; generating indication information, the indication information comprising a number of beam groups and identifiers corresponding to beams in each beam group sending a synchronization signal block (SSB), wherein the identifier corresponding to the beam to be sent is used for indicating a correspondence between SSBs in a corresponding beam group and remaining minimum system information (RMSI); and sending an SSB corresponding to the beam to be sent and the indication information to user equipment. According to embodiments of this disclosure, the correspondence between the RMSI and the SSB can be indicated without increasing bit overhead.

14 Claims, 6 Drawing Sheets

(56) References Cited

U.S. PATENT DOCUMENTS

| | | | |
|---|---|---|---|
| 2018/0205585 A1* | 7/2018 | Sadiq | H04L 27/2613 |
| 2019/0058538 A1* | 2/2019 | Sun | H04W 74/0891 |
| 2019/0110244 A1* | 4/2019 | Shih | H04W 48/16 |
| 2019/0356524 A1* | 11/2019 | Yi | H04B 7/0695 |
| 2020/0008247 A1* | 1/2020 | Kwak | H04W 74/004 |
| 2020/0187093 A1* | 6/2020 | Awad | H04W 72/005 |
| 2020/0213947 A1* | 7/2020 | Li | H04W 72/048 |
| 2020/0305099 A1* | 9/2020 | Liu | H04B 7/0408 |
| 2020/0404617 A1* | 12/2020 | Murray | H04W 52/0229 |

OTHER PUBLICATIONS

Extended European Search Report in European Application No. 17928296.7, dated Apr. 15, 2021.
3GPP TR 38.811V0.1.0 (Jun. 2017), 3rd Generation Partnership Project Technical Specification Group Radio Access Network, Study on New Radio (NR) to support Non Terrestrial Networks (Release 15).
ZTE. SANECHIPS, Remaining Details of Synchronization Signal Design, 3GPP TSG RAN WG1 Meeting #90bis, R1-1717030, Prague, Czech Republic, Oct. 9-13, 2017, 6 pages.
Ericsson, Additional Synchronization Provision, 3GPP TSG RAN WG1 Meeting #90bis, R1-1717761, Prague, Czech Republic, Oct. 9-13, 2017, 10 pages.
Sony, Remaining Details on Remaining Minimum System Information, 3GPP TSG RAN WG1 Meeting NR#3, R1-1718664, Prague, Czech Republic, Oct. 9-13, 2017, 3 pages.
International Search Report in the International Application No. PCT/CN2017/105725, dated Jul. 4, 2018.
English translation of the Written Opinion of the International Search Authority in the international Application No. PCT/CN2017/105725, dated Jul. 4, 2018.

* cited by examiner

US 11,317,394 B2

CORRESPONDENCE INDICATING AND DETERMINING METHOD AND APPARATUS, BASE STATION, AND USER EQUIPMENT

CROSS REFERENCE TO RELATED APPLICATIONS

This application is a national phase application based on PCT/CN2017/105725, filed Oct. 11, 2017, the content of which is incorporated herein by reference.

TECHNICAL FIELD

The present disclosure relates to the technical field of communications, and more particularly, to a method, apparatus, base station, user equipment (UE), and computer-readable storage medium for indicating and determining correspondence.

BACKGROUND

With the rapid development of a wireless communication technology, a 5th Generation mobile communication technology (5G) system has appeared. The 5G system will be targeted at high frequency band applications, that is, applications in a frequency band above 6 GHz. In a high frequency band, due to the poor propagation characteristics of radio waves, traditional omnidirectional transmission will no longer be applicable, and beam scanning and beam management need to be introduced for communication.

In the recent 3rd Generation Partnership Project (3GPP) discussion, the concept of wideband was introduced, and it was determined that wideband may have frequency domain distribution of a plurality of synchronization signal blocks (SSBs). Therefore, whether the plurality of SSBs correspond to a plurality pieces of remaining minimum system information (RMSI) or one piece of RMSI is a technical problem to be solved.

At present, a base station may configure control domain information of RMSI on a Physical Broadcast Channel (PBCH) in an SSB. However, after finding a control domain according to the control domain information and extracting the RMSI, a UE still does not know a system-configured correspondence between RMSI and SSBs. For a wideband UE, due to that the wideband UE can work in the entire wideband, the correspondence needs to be known when rate matching in order to perform rate matching according to a position of the RMSI, which requires an indication of the correspondence in the RMSI.

SUMMARY

In view of this, the present disclosure discloses a method, apparatus, base station, UE, and computer-readable storage medium for indicating and determining correspondence, so as to indicate a correspondence between RMSI and SSBs without increasing bit overheads.

According to a first aspect of embodiments of the present disclosure, a method for indicating correspondence is provided. The method may be applied to a base station. The method may include:

determining a beam to be sent;

generating indication information, the indication information including a number of beam groups and identifiers corresponding to beams in each beam group for sending an SSB, wherein an identifier corresponding to the beam to be sent is configured to indicate a correspondence between SSBs in a corresponding beam group and RMSI; and sending an SSB corresponding to the beam to be sent and the indication information to a UE.

In one embodiment, the method may further include:

grouping the beams according to the number of beam groups.

In one embodiment, an identifier corresponding to a beam, except the beam to be sent, in each beam group for sending the SSB may be configured to indicate whether the corresponding beam is for sending the SSB.

In one embodiment, the indication information may be carried in the RMSI.

According to a second aspect of the embodiments of the present disclosure, a method for determining correspondence is provided. The method may be applied to a UE. The method may include:

receiving an SSB corresponding to a beam to be sent and indication information from a base station, the indication information including a number of beam groups and identifiers corresponding to beams in each beam group for sending the SSB, wherein an identifier corresponding to the beam to be sent is configured to indicate a correspondence between SSBs in a corresponding beam group and RMSI;

parsing a time indicator (TI) from the SSB, and determining a position of the SSB in a beam group to which the SSB belongs according to the TI and the number of beam groups; and acquiring an identifier corresponding to the beam to be sent according to the position, and determining the correspondence between SSBs in the corresponding beam group and RMSI according to the identifier corresponding to the beam to be sent.

In one embodiment, determining the correspondence between SSBs in the corresponding beam group and RMSI according to the identifier corresponding to the beam to be sent may include:

when the identifier corresponding to the beam to be sent is a first identifier, determining the correspondence between SSBs in the corresponding beam group and RMSI as a one-to-one relationship; and when the identifier corresponding to the beam to be sent is a second identifier, determining the correspondence between SSBs in the corresponding beam group and RMSI as a many-to-one relationship.

In one embodiment, the method may further include:

receiving, for the beam group in which the correspondence between SSBs and RMSI is the one-to-one relationship, data at a position, except a position of the corresponding RMSI, in the SSB.

In one embodiment, an identifier corresponding to a beam, except the beam to be sent, in each beam group for sending an SSB may be configured to indicate whether the corresponding beam is for sending the SSB.

In one embodiment, the indication information may be carried in the RMSI.

According to a third aspect of embodiments of the present disclosure, a device for indicating correspondence is provided. The device may be applied to a base station. The device may include:

a determining module, configured to determine a beam to be sent;

a generating module, configured to generate indication information, the indication information including a number of beam groups and identifiers corresponding to beams in each beam group for sending an SSB, wherein an identifier corresponding to the beam to be sent is configured to indicate a correspondence between SSBs in a corresponding beam group and RMSI; and a sending module, configured to send an SSB corresponding to the beam to be sent which is determined by the determining module, and the indication information which is generated by the generating module to a UE.

In one embodiment, the device may further include:

a grouping module, configured to group the beams according to the number of beam groups which is included in the indication information generated by the generating module.

In one embodiment, an identifier corresponding to a beam, except the beam to be sent, in each beam group for sending the SSB may be configured to indicate whether the corresponding beam is for sending the SSB.

In one embodiment, the indication information may be carried in the RMSI.

According to a fourth aspect of the embodiments of the present disclosure, a device for determining correspondence is provided. The device may be applied to a UE. The device may include:

a receiving module, configured to receive an SSB corresponding to a beam to be sent and indication information from a base station, the indication information including a number of beam groups and identifiers corresponding to beams in each beam group for sending the SSB, wherein an identifier corresponding to the beam to be sent is configured to indicate a correspondence between SSBs in a corresponding beam group and RMSI;

a parsing and determining module, configured to parse a TI from the SSB which is received by the receiving module, and determine a position of the SSB in a beam group to which the SSB belongs according to the TI and the number of beam groups; and an acquiring and determining module, configured to acquire an identifier corresponding to the beam to be sent according to the position which is determined by the parsing and determining module, and determine the correspondence between SSBs in the corresponding beam group and RMSI according to the identifier corresponding to the beam to be sent.

In one embodiment, the acquiring and determining module may include:

a first determining sub-module, configured to determine, when the identifier corresponding to the beam to be sent is a first identifier, the correspondence between SSBs in the corresponding beam group and RMSI as a one-to-one relationship; and a second determining sub-module, configured to determine, when the identifier corresponding to the beam to be sent is a second identifier, the correspondence between SSBs in the corresponding beam group and RMSI as a many-to-one relationship.

In one embodiment, the device may further include:

a data receiving module, configured to receive, for the beam group in which the correspondence between SSBs and RMSI is the one-to-one relationship, which is determined by the first determining sub-module, data at a position, except a position of the corresponding RMSI, in the SSB.

In one embodiment, an identifier corresponding to a beam, except the beam to be sent, in each beam group for sending the SSB may be configured to indicate whether the corresponding beam is for sending the SSB.

In one embodiment, the indication information may be carried in the RMSI.

According to a fifth aspect of the embodiments of the present disclosure, a base station is provided. The base station may include:

a processor; and a memory configured to store instructions executable for the processor.

The processor may be configured to:

determine a beam to be sent;

generate indication information, the indication information including a number of beam groups and identifiers corresponding to beams in each beam group for sending an SSB, wherein an identifier corresponding to the beam to be sent is configured to indicate a correspondence between SSBs in a corresponding beam group and RMSI; and send an SSB corresponding to the beam to be sent and the indication information to a UE.

According to a sixth aspect of the embodiments of the present disclosure, a UE is provided. The UE may include:

a processor; and a memory configured to store instructions executable for the processor.

The processor may be configured to:

receive an SSB corresponding to a beam to be sent and indication information from a base station, the indication information including a number of beam groups and identifiers corresponding to beams in each beam group for sending an SSB, wherein an identifier corresponding to the beam to be sent is configured to indicate a correspondence between SSBs in a corresponding beam group and RMSI;

parse a TI from the SSB, and determine a position of the SSB in a beam group to which the SSB belongs according to the TI and the number of beam groups; and acquire an identifier corresponding to the beam to be sent according to the position, and determine the correspondence between SSBs in the corresponding beam group and RMSI according to the identifier corresponding to the beam to be sent.

According to a seventh aspect of the embodiments of the present disclosure, a computer-readable storage medium is provided. A computer program may be stored thereon. When executed by a processor, the computer program implements the steps of the above described method for indicating correspondence.

According to an eighth aspect of the embodiments of the present disclosure, a computer-readable storage medium is provided. A computer program may be stored thereon. When executed by a processor, the computer program implements the steps of the above described method for determining correspondence.

The technical solutions provided by the embodiments of the present disclosure may include the following beneficial effects.

A beam to be sent is determined, and indication information including an identifier corresponding to the beam to be sent is generated. Then, an SSB corresponding to the beam to be sent and the indication information are sent to a UE, such that the UE may determine a correspondence between SSBs in a corresponding beam group and RMSI. Since the identifier corresponding to the beam to be sent is configured to indicate the correspondence between SSBs in the corresponding beam group and RMSI, the indication of the correspondence between RMSI and SSBs can be implemented without increasing bit overheads.

A TI is parsed from a received SSB, and a position of the SSB in a beam group to which the SSB belongs is determined according to the TI and a number of received beam groups. Then, an identifier corresponding to a beam to be sent is acquired according to the position, and a correspondence between SSBs in a corresponding beam group and RMSI is determined according to the identifier corresponding to the beam to be sent, thereby implementing the determination of the correspondence between SSBs and RMSI according to the indication information which is sent by a base station, without additionally increasing bit overheads during the implementation process.

It should be understood that the above general descriptions and detailed descriptions below are only exemplary and explanatory, and not intended to limit the present disclosure.

BRIEF DESCRIPTION OF THE DRAWINGS

The accompanying drawings, which are incorporated in and constitute a part of this specification, illustrate embodiments in conformity with the present disclosure, and together with the specification, serve to explain the principles of the present disclosure.

DETAILED DESCRIPTION

Here, reference will be made in detail to exemplary embodiments, examples of which are illustrated in the accompanying drawings. When the following description refers to the accompanying drawings, the same numbers in different drawings represent the same or similar elements unless otherwise represented. The implementations set forth in the following description of exemplary embodiments do not represent all implementations consistent with the present disclosure. In contrast, they are merely examples of devices and methods which are consistent with aspects of the present disclosure as detailed in the appended claims.

Figure 1:
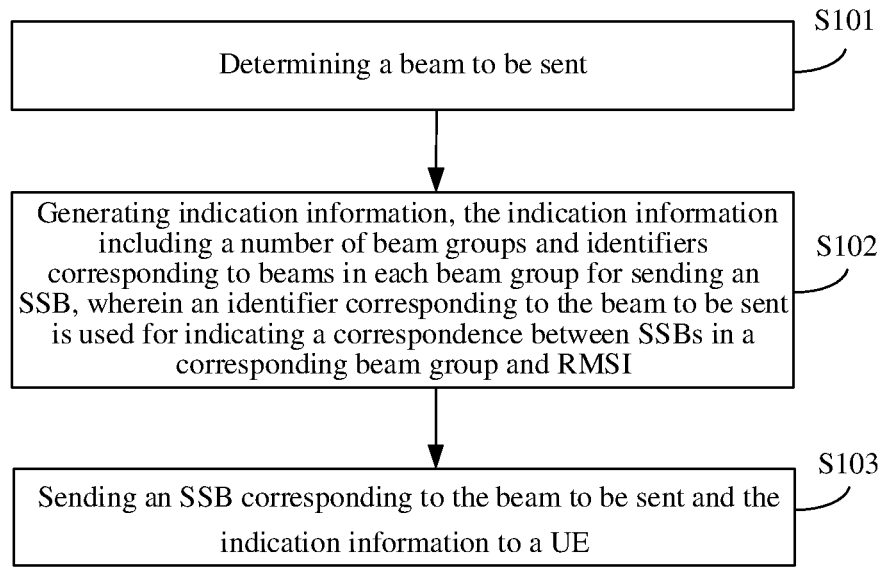
FIG. 1 is a flowchart of a method for indicating correspondence according to an exemplary embodiment of the present disclosure.

FIG. 1 is a flowchart of a method for indicating correspondence according to an exemplary embodiment of the present disclosure. This embodiment is described from the base station side. As shown in FIG. 1, the method for indicating correspondence includes the following steps.

In S101, a beam to be sent is determined.

In this embodiment, the base station may determine an SSB of a certain beam. The determined beam is referred to as a beam to be sent. The beam to be sent may be one beam, or may be a plurality of beams.

In step S102, indication information is generated. The indication information includes a number of beam groups and identifiers corresponding to beams in each beam group for sending an SSB. An identifier corresponding to the beam to be sent is configured to indicate a correspondence between SSBs in a corresponding beam group and RMSI.

The indication information may be carried in the RMSI. When the identifier corresponding to the beam to be sent is a first identifier, for example, 0, it may be indicated that the correspondence between SSBs in the corresponding beam group and RMSI is a one-to-one relationship. When the identifier corresponding to the beam to be sent is a second identifier, for example, 1, it may be indicated that the correspondence between SSBs in the corresponding beam group and RMSI is a many-to-one relationship.

Optionally, when generating indication information or before generating indication information, the method may further include: grouping the beams according to the number of beam groups. For example, there are at most 64 beams, which may be divided into eight beam groups. In this embodiment, the indication information may further include an identifier for indicating whether each beam group is for sending an SSB.

An identifier corresponding to a beam, except the beam to be sent, in each beam group for sending an SSB is configured to indicate whether the corresponding beam is for sending an SSB.

Assuming that the beam to be sent is beam 1, beam group 1 sends an SSB, beam group 1 includes beams 0 to 7, and identifiers corresponding to beams in beam group 1 are {1, 0, 0, 1, 0, 1, 1, 1}, the identifier (that is, 0) corresponding to beam 1 is used to indicate that the correspondence between SSBs in beam group 1 and RMSI is a one-to-one relationship, and other identifiers are used to indicate whether the corresponding beams are for sending SSBs.

In S103, an SSB corresponding to the beam to be sent and the indication information are sent to a UE.

The base station sends, to the UE, the SSB corresponding to the beam to be sent, for example, beam 1, and the indication information. After receiving the SSB and the indication information, the UE may determine the correspondence between SSBs in the corresponding beam group and RMSI.

In the above described embodiment, a beam to be sent is determined, and indication information including an identifier which corresponds to the beam to be sent is generated. Then, an SSB corresponding to the beam to be sent and the indication information are sent to a UE, such that the UE may determine the correspondence between SSBs in the corresponding beam group and RMSI. Since the identifier corresponding to the beam to be sent is configured to indicate the correspondence between SSBs in the corresponding beam group and RMSI, the indication of the correspondence between RMSI and SSBs can be implemented without increasing bit overheads.

Figure 2:
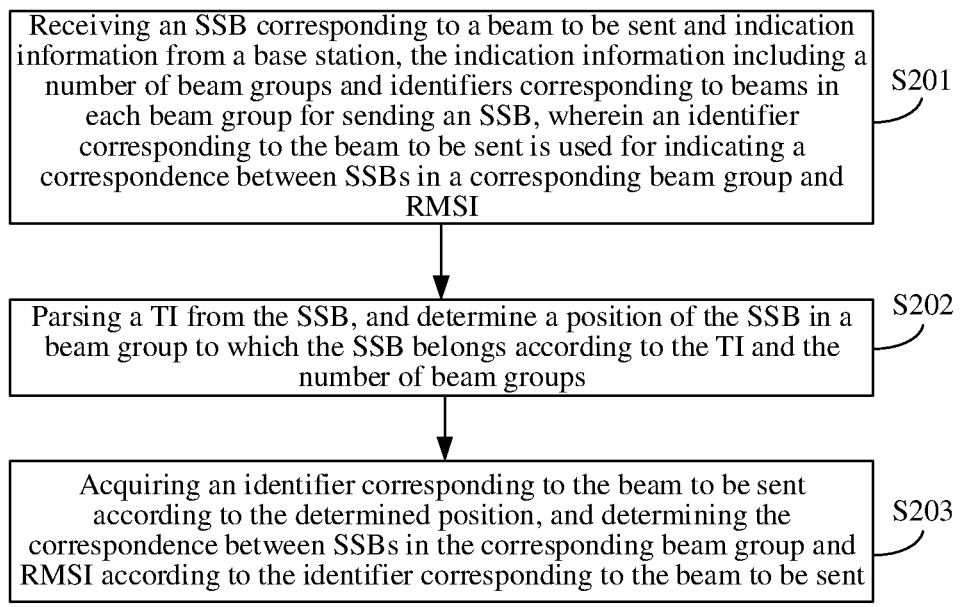
FIG. 2 is a flowchart of a method for determining correspondence according to an exemplary embodiment of the present disclosure.

FIG. 2 is a flowchart of a method for determining correspondence according to an exemplary embodiment of the present disclosure. This embodiment is described from the UE side. As shown in FIG. 2, the method includes the following steps.

In S201, an SSB corresponding to a beam to be sent and indication information are received from a base station. The indication information includes a number of beam groups and identifiers corresponding to beams in each beam group for sending an SSB. An identifier corresponding to the beam to be sent is configured to indicate a correspondence between SSBs in the corresponding beam group and RMSI.

The indication information may be carried in the RMSI.

In addition, an identifier corresponding to a beam, except the beam to be sent, in each beam group for sending an SSB may be configured to indicate whether the corresponding beam is for sending an SSB.

In S202, a time indicator (TI) is parsed from the SSB, and a position of the SSB in a beam group to which the SSB belongs is determined according to the TI and the number of beam groups.

In this embodiment, after receiving the SSB and the indication information sent from the base station, the UE may parse a TI from the SSB. Assuming that the parsed TI is 1 and the number of beam groups is 8, it may be determined that the beam group to which the SSB belongs is beam group 1, and that a position of the SSB in beam group 1 is 2.

In S203, an identifier corresponding to the beam to be sent is acquired according to the determined position, and the correspondence between SSBs in the corresponding beam group and RMSI is determined according to the identifier corresponding to the beam to be sent.

In this embodiment, when the identifier corresponding to the beam to be sent is a first identifier, for example, 0, the correspondence between SSBs in the corresponding beam group and RMSI may be determined as a one-to-one relationship. When the identifier corresponding to the beam to be sent is a second identifier, for example, 1, the correspondence between SSBs in the corresponding beam group and RMSI may be determined as a many-to-one relationship.

Assuming that identifiers corresponding to beams in beam group 1 are {1, 0, 0, 1, 0, 1, 1, 1}, it may be acquired that the identifier corresponding to the beam to be sent is 0 according to the position of the SSB, that is, a second position, in beam group 1, and it may be determined that the correspondence between SSBs in beam group 1 and RMSI is a one-to-one relationship.

In this embodiment, when the identifier corresponding to the beam to be sent is a first identifier, it is determined that the correspondence between SSBs in the corresponding beam group and RMSI is a one-to-one relationship. When the identifier corresponding to the beam to be sent is a second identifier, it is determined that the correspondence between SSBs in the corresponding beam group and RMSI is a many-to-one relationship. The implementation manner is simple.

In addition, for the beam group in which the correspondence between SSBs and RMSI is the one-to-one relationship, a wideband UE may receive data at a position, except a position of the corresponding RMSI, in the SSB.

For example, assuming that there is a one-to-one correspondence between four SSBs and four RMSIs, the UE needs to receive data at a position except the locations of the four RMSIs when receiving data. That is to say, the locations of the four RMSIs are not used for data transmission.

The wideband UE receives data at a position, except the position of the corresponding RMSI, in the SSB, so as to achieve correct receiving of data.

In the above described embodiment, a TI is parsed from the received SSB, and a position of the SSB in a beam group to which the SSB belongs is determined according to the TI and a number of received beam groups. Then, an identifier corresponding to a beam to be sent is acquired according to the position, and a correspondence between SSBs in a corresponding beam group and RMSI is determined according to the identifier corresponding to the beam to be sent, thereby implementing the determination of the correspondence between SSBs and RMSI according to the indication information which is sent by a base station, without additionally increasing bit overheads during the implementation process.

Figure 3:
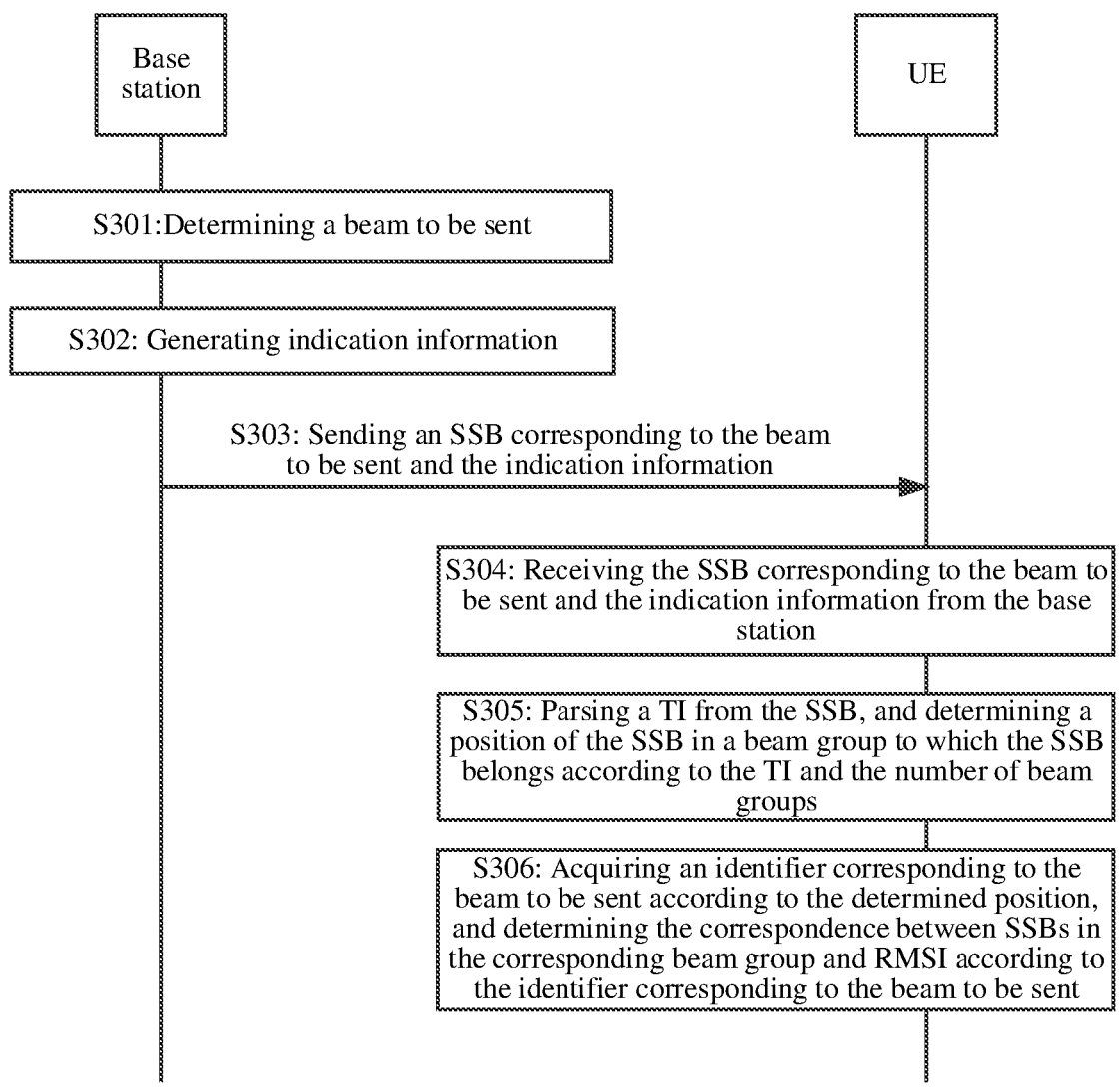
FIG. 3 is a signaling flowchart of a method for determining correspondence according to an exemplary embodiment of the present disclosure.

FIG. 3 is a signaling flowchart of a method for determining a synchronization block, according to an exemplary embodiment of the present disclosure. This embodiment is described from the perspective of interaction between a base station and a UE. As shown in FIG. 3, the method for determining a synchronization block includes the following steps.

In S301, the base station determines a beam to be sent.

In S302, the base station generates indication information. The indication information includes a number of beam groups and identifiers corresponding to beams in each beam group for sending an SSB. An identifier corresponding to a beam, except the beam to be sent, in each beam group for sending an SSB is configured to indicate whether the corresponding beam is for sending an SSB. An identifier corresponding to the beam to be sent is configured to indicate a correspondence between SSBs in the corresponding beam group and RMSI.

In S303, the base station sends an SSB corresponding to the beam to be sent and the indication information to the UE.

In S304, the UE receives the SSB corresponding to the beam to be sent and the indication information from the base station.

In S305, the UE parses a TI from the SSB, and determines a position of the SSB in the beam group to which the SSB belongs according to the TI and the number of beam groups.

In S306, the UE acquires an identifier corresponding to the beam to be sent according to the determined position, and determines the correspondence between SSBs in the corresponding beam group and RMSI according to the identifier corresponding to the beam to be sent.

In the above described embodiment, the interaction between the base station and the UE enables the base station to indicate the correspondence between RMSI and SSBs through the indication information without increasing bit overheads, such that the UE may determine the correspondence between SSBs and RMSI according to the indication information which is sent by the base station, without additionally increasing bit overheads during the implementation process.

Figure 4:
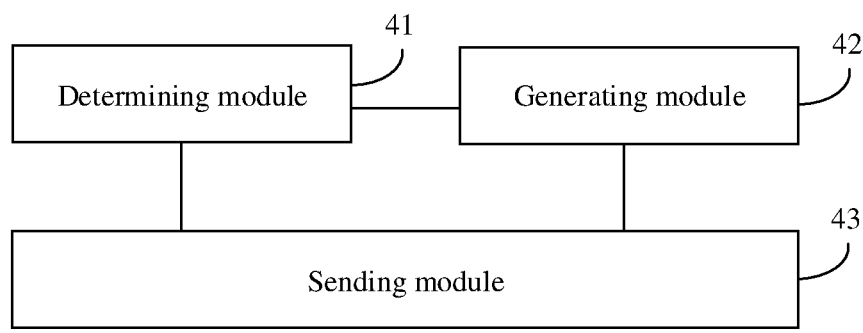
FIG. 4 is a block diagram of a device for indicating correspondence according to an exemplary embodiment.

FIG. 4 is a block diagram of a device for indicating correspondence according to an exemplary embodiment. The indicating device may be located in a base station. As shown in FIG. 4, the device for indicating a synchronization block includes a determining module 41, a generating module 42 and a sending module 43.

The determining module 41 is configured to determine a beam to be sent.

In this embodiment, the base station may determine an SSB of a certain beam. The determined beam is referred to as a beam to be sent. The beam to be sent may be one beam, or may be a plurality of beams.

The generating module 42 is configured to generate indication information. The indication information includes a number of beam groups and identifiers corresponding to beams in each beam group for sending an SSB. An identifier corresponding to the beam to be sent is configured to indicate a correspondence between SSBs in a corresponding beam group and RMSI.

The indication information may be carried in the RMSI. When the identifier corresponding to the beam to be sent is a first identifier, for example, 0, it may be indicated that the correspondence between SSBs in the corresponding beam group and RMSI is a one-to-one relationship. When the identifier corresponding to the beam to be sent is a second identifier, for example, 1, it may be indicated that the correspondence between SSBs in the corresponding beam group and RMSI is a many-to-one relationship.

Optionally, when generating indication information or before generating indication information, the method may further include: grouping the beams according to the number of beam groups. For example, there are at most 64 beams, which may be divided into 8 beam groups. In this embodiment, the indication information may further include an identifier for indicating whether each beam group is for sending an SSB.

An identifier corresponding to a beam, except the beam to be sent, in each beam group for sending an SSB is configured to indicate whether the corresponding beam is for sending an SSB.

Assuming that the beam to be sent is beam 1, beam group 1 sends an SSB, beam group 1 includes beams 0 to 7, and identifiers corresponding to beams in beam group 1 are {1, 0, 0, 1, 0, 1, 1, 1}, the identifier (that is, 0) corresponding to beam 1 is used to indicate that the correspondence between SSBs in beam group 1 and RMSI is a one-to-one relationship, and other identifiers are used to indicate whether the corresponding beams are for sending SSBs.

The sending module 43 is configured to send an SSB corresponding to the beam to be sent which is determined by the determining module 41, and the indication information which is generated by the generating module 42, to a UE.

The base station sends, to the UE, the SSB corresponding to the beam to be sent, for example, beam 1, and the indication information. After receiving the SSB and the indication information, the UE may determine the correspondence between SSBs in the corresponding beam group and RMSI.

In the above described embodiment, a beam to be sent is determined, and indication information including an identifier which corresponds to the beam to be sent is generated. Then, an SSB corresponding to the beam to be sent and the indication information are sent to a UE, such that the UE may determine the correspondence between SSBs in the corresponding beam group and RMSI. Since the identifier corresponding to the beam to be sent is configured to indicate the correspondence between SSBs in the corresponding beam group and RMSI, the indication of the correspondence between RMSI and SSBs can be implemented without increasing bit overheads.

Figure 5:
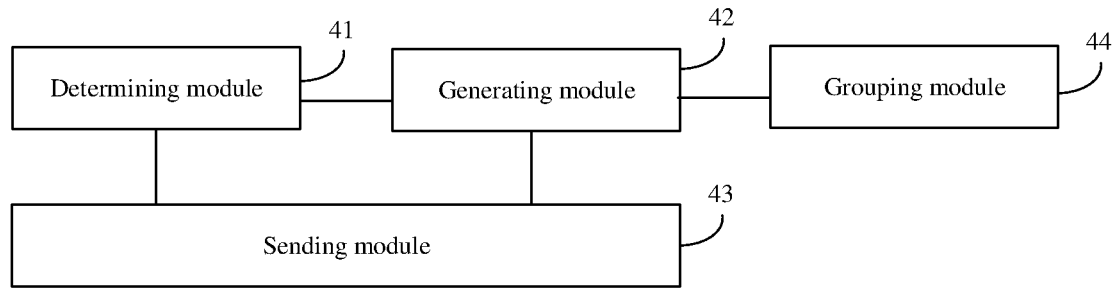
FIG. 5 is a block diagram of another device for indicating correspondence according to an exemplary embodiment.

FIG. 5 is a block diagram of another device for indicating correspondence according to an exemplary embodiment. As shown in FIG. 5, on the basis of the above described embodiment shown in FIG. 4, the device may further include a grouping module 44.

The grouping module 44 is configured to group the beams according to the number of beam groups which is included in the indication information generated by the generating module 42.

Optionally, when generating indication information or before generating indication information, the method may further include: grouping the beams according to the number of beam groups. For example, there are at most 64 beams, which may be divided into 8 beam groups.

In the above described embodiment, through grouping beams according to the number of beam groups, conditions are provided for generating the indication information.

Figure 6:
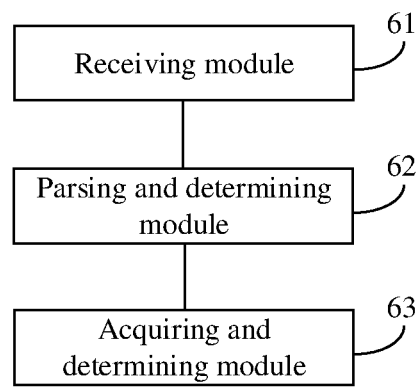
FIG. 6 is a block diagram of a device for determining correspondence according to an exemplary embodiment.

FIG. 6 is a block diagram of a device for determining correspondence according to an exemplary embodiment. The determining device may be located in a UE. As shown in FIG. 6, the device includes a receiving module 61, a parsing and determining module 62, and an acquiring and determining module 63.

The receiving module 61 is configured to receive an SSB corresponding to a beam to be sent and indication information from a base station. The indication information includes a number of beam groups and identifiers corresponding to beams in each beam group for sending the SSB. An identifier corresponding to the beam to be sent is configured to indicate a correspondence between SSBs in a corresponding beam group and RMSI.

The indication information may be carried in the RMSI.

In addition, an identifier corresponding to a beam, except the beam to be sent, in each beam group for sending an SSB may be configured to indicate whether the corresponding beam is for sending an SSB.

The parsing and determining module 62 is configured to parse a time indicator (TI) from the SSB which is received by the receiving module 61, and determine a position of the SSB in a group to which the SSB belongs according to the TI and the number of beam groups.

In this embodiment, after receiving the SSB and the indication information which are sent from the base station, the UE may parse a TI from the SSB. Assuming that the parsed TI is 1 and the number of beam groups is 8, it may be determined that the beam group to which the SSB belongs is beam group 1, and that a position of the SSB in beam group 1 is 2.

The acquiring and determining module 63 is configured to acquire an identifier corresponding to the beam to be sent according to the position which is determined by the parsing and determining module 62, and determine the correspondence between SSBs in the corresponding beam group and RMSI according to the identifier corresponding to the beam to be sent.

In this embodiment, when the identifier corresponding to the beam to be sent is a first identifier, for example, 0, the correspondence between SSBs in the corresponding beam group and RMSI may be determined as a one-to-one relationship. When the identifier corresponding to the beam to be sent is a second identifier, for example, 1, the correspondence between SSBs in the corresponding beam group and RMSI may be determined as a many-to-one relationship.

Assuming that identifiers corresponding to beams in beam group 1 are {1, 0, 0, 1, 0, 1, 1, 1}, it may be acquired that the identifier corresponding to the beam to be sent is 0 according to the position of the SSB, that is, a second position, in beam group 1, and it may be determined that the correspondence between SSBs in beam group 1 and RMSI is a one-to-one relationship.

In the above described embodiment, a TI is parsed from a received SSB, and a position of the SSB in a beam group to which the SSB belongs is determined according to the TI and a number of received beam groups. Then, an identifier corresponding to a beam to be sent is acquired according to the position, and a correspondence between SSBs in a corresponding beam group and RMSI is determined according to the identifier corresponding to the beam to be sent, thereby implementing the determination of the correspondence between SSBs and RMSI according to the indication information which is sent by a base station, without additionally increasing bit overheads during the implementation process.

Figure 7:
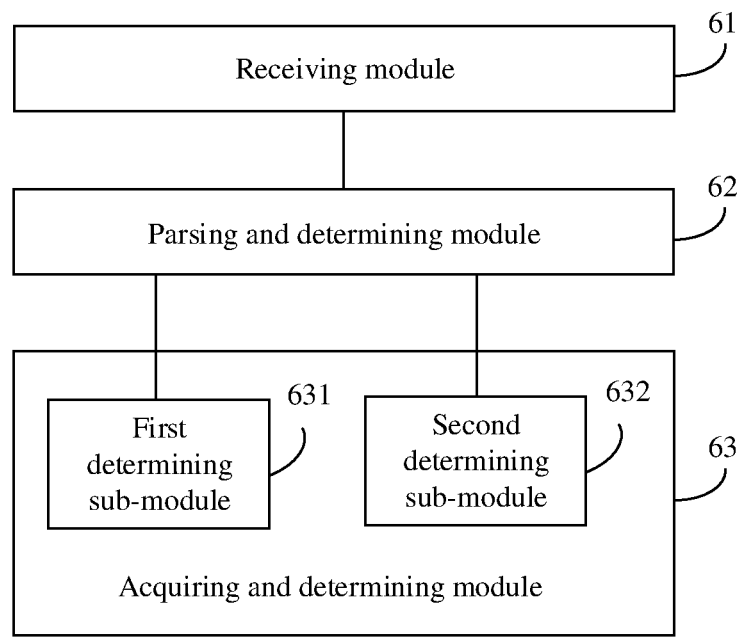
FIG. 7 is a block diagram of another device for determining correspondence according to an exemplary embodiment.

FIG. 7 is a block diagram of another device for determining correspondence according to an exemplary embodiment. As shown in FIG. 7, on the basis of the above described embodiment shown in FIG. 6, the acquiring and determining module 63 may include a first determining sub-module 631 and a second determining sub-module 632.

The first determining sub-module 631 is configured to determine, when the identifier corresponding to the beam to be sent is a first identifier, the correspondence between SSBs in the corresponding beam group and RMSI as a one-to-one relationship.

The second determining sub-module 632 is configured to determine, when the identifier corresponding to the beam to be sent is a second identifier, the correspondence between SSBs in the corresponding beam group and RMSI as a many-to-one relationship.

In this embodiment, when the identifier corresponding to the beam to be sent is a first identifier, for example, 0, the correspondence between SSBs in the corresponding beam group and RMSI may be determined as a one-to-one relationship. When the identifier corresponding to the beam to be sent is a second identifier, for example, 1, the correspondence between SSBs in the corresponding beam group and RMSI may be determined as a many-to-one relationship.

Assuming that identifiers corresponding to beams in beam group 1 are {1, 0, 0, 1, 0, 1, 1, 1}, it may be acquired that the identifier corresponding to the beam to be sent is 0 according to the position of the SSB, that is, a second position, in beam group 1, and it may be determined that the correspondence between SSBs in beam group 1 and RMSI is a one-to-one relationship.

In the above described embodiment, when the identifier corresponding to the beam to be sent is a first identifier, it is determined that the correspondence between SSBs in the corresponding beam group and RMSI is a one-to-one relationship. When the identifier corresponding to the beam to be sent is a second identifier, it is determined that the correspondence between SSBs in the corresponding beam group and RMSI is a many-to-one relationship. The implementation manner is simple.

Figure 8:
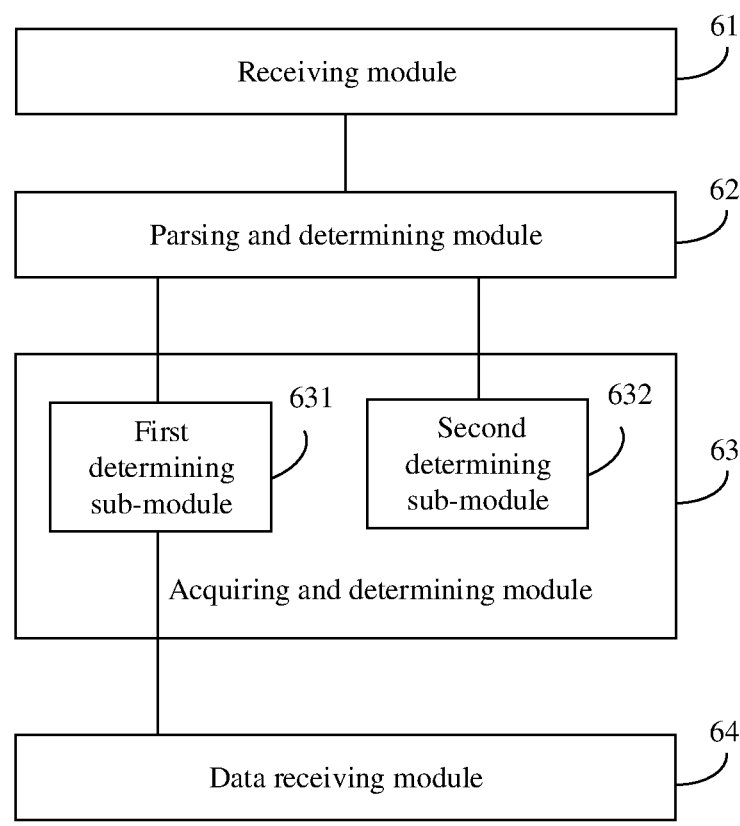
FIG. 8 is a block diagram of another device for determining correspondence according to an exemplary embodiment.

FIG. 8 is a block diagram of another device for determining correspondence according to an exemplary embodiment. As shown in FIG. 8, on the basis of the above described embodiment shown in FIG. 7, the device may further include a data receiving module 64.

The data receiving module 64 is configured to receive, for the beam group in which the correspondence between SSBs and RMSI is the one-to-one relationship which is determined by the first determining sub-module 631, data at a position, except the location of the corresponding RMSI, in the SSB.

In this embodiment, for the beam group in which the correspondence between SSBs and RMSI is the one-to-one relationship, a wideband UE may receive data at a position, except the location of the corresponding RMSI, in the SSB.

For example, assuming that there is a one-to-one correspondence between four SSBs and four RMSIs, the UE needs to receive data at a position except the locations of the four RMSIs when receiving data. That is to say, the locations of the four RMSIs are not used for data transmission.

In the above described embodiment, the wideband UE receives data at a position, except the position of the corresponding RMSI, in the SSB, so as to achieve correct receiving of data.

Figure 9:
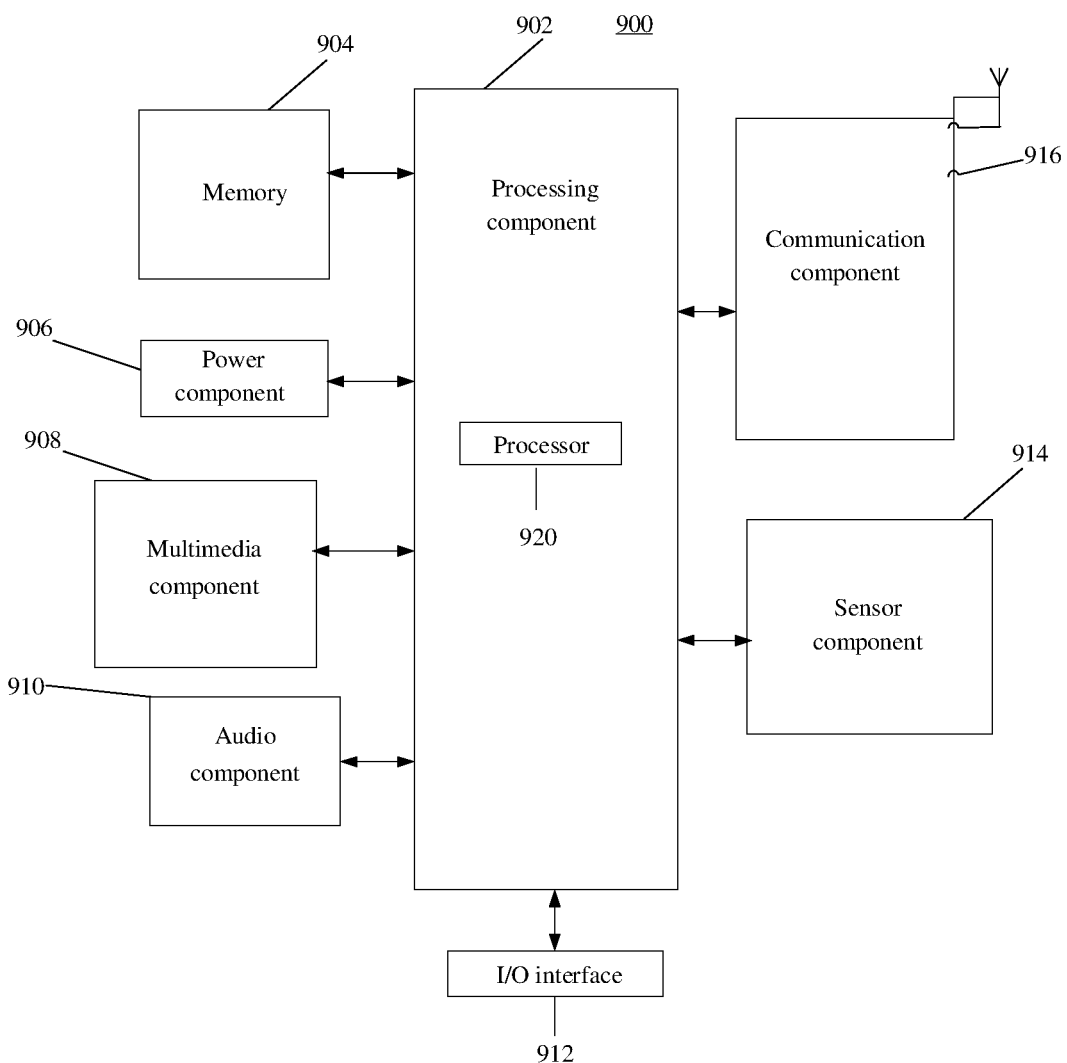
FIG. 9 is a block diagram of a device suitable for determining correspondence according to an exemplary embodiment.

FIG. 9 is a block diagram of a device suitable for determining correspondence according to an exemplary embodiment. For example, the device 900 may be a UE such as a mobile phone, a computer, a digital broadcast terminal, a messaging device, a gaming console, a tablet, a medical device, exercise equipment, and a personal digital assistant.

Referring to FIG. 9, the device 900 may include one or more of the following components: a processing component 902, a memory 904, a power component 906, a multimedia component 908, an audio component 910, an Input/Output (I/O) interface 912, a sensor component 914, and a communication component 916.

The processing component 902 typically controls overall operations of the device 900, such as operations associated with display, telephone calls, data communications, camera operations, and recording operations. The processing component 902 may include one or more processors 920 to execute instructions, so as to complete all or part of the steps in the above described methods. Moreover, the processing component 902 may include one or more modules which facilitate the interaction between the processing component 902 and other components. For example, the processing component 902 may include a multimedia module to facilitate the interaction between the multimedia component 908 and the processing component 902.

One of the processors 920 in the processing component 902 may be configured to:

receive an SSB corresponding to a beam to be sent and indication information from a base station, the indication information including a number of beam groups and identifiers corresponding to beams in each beam group for sending an SSB, wherein an identifier corresponding to the beam to be sent is configured to indicate a correspondence between SSBs in a corresponding beam group and RMSI;

parse a TI from the SSB, and determine a position of the SSB in a beam group to which the SSB belongs according to the TI and the number of beam groups; and acquire an identifier corresponding to the beam to be sent according to the determined position, and determine the correspondence between SSBs in the corresponding beam group and RMSI according to the identifier corresponding to the beam to be sent.

The memory 904 is configured to store various types of data to support the operation of the device 900. Examples of such data include instructions for any applications or methods which are operated on the device 900, contact data, phonebook data, messages, pictures, video, etc. The memory 904 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 906 provides power to various components of the device 900. The power component 906 may include: a power management system, one or more power sources, and any other components associated with the generation, management and distribution of power in the device 900.

The multimedia component 908 includes a screen which provides an output interface between the device 900 and the user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a duration time and a pressure associated with the touch or swipe action. In some embodiments, the multimedia component 908 includes a front camera and/or a rear camera. The front camera and/or the rear camera may receive an external multimedia datum when the device 900 is in an operation mode, such as a photographing mode or a video mode. Each of the front camera and the rear camera may be a fixed optical lens system or may have focus and optical zoom capability.

The audio component 910 is configured to output and/or input audio signals. For example, the audio component 910 includes a MIC. The MIC is configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, or buttons. The buttons may include, but are not limited to, a home button, a volume button, a starting button, and a locking button.

The sensor component 914 includes one or more sensors to provide status assessments of various aspects for the device 900. For example, the sensor component 914 may detect an open/closed status of the device 900, and relative positioning of components. For example, the component is the display and the keypad of the device 900. The sensor component 914 may also detect a change in position of the device 900 or of a component of the device 900, a presence or absence of user contact with the device 900, an orientation or an acceleration/deceleration of the device 900, and a change in temperature of the device 900. The sensor component 914 may include a proximity sensor which is configured to detect the presence of nearby objects without any physical contact. The sensor component 914 may also include a light sensor, such as a Complementary Metal Oxide Semiconductor (CMOS) or Charge Coupled Device (CCD) image sensor, for use in imaging applications. In some embodiments, the sensor component 914 may also include an acceleration sensor, a gyroscope sensor, a magnetic sensor, a pressure sensor, or a temperature sensor.

The communication component 916 is configured to facilitate communication, wired or wirelessly, between the device 900 and other devices. The device 900 may access a wireless network based on a communication standard, such as WiFi, 2G or 3G, or a combination thereof. In one exemplary embodiment, the communication component 916 receives a broadcast signal or broadcast associated information from an external broadcast management system via a broadcast channel In one exemplary embodiment, the communication component 916 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the device 900 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described method for determining correspondence.

In exemplary embodiments, there is also provided a non-transitory computer-readable storage medium including instructions, for example, the memory 904 including instructions. The above instructions is executable by the processor 920 of the device 900 to complete the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 10:
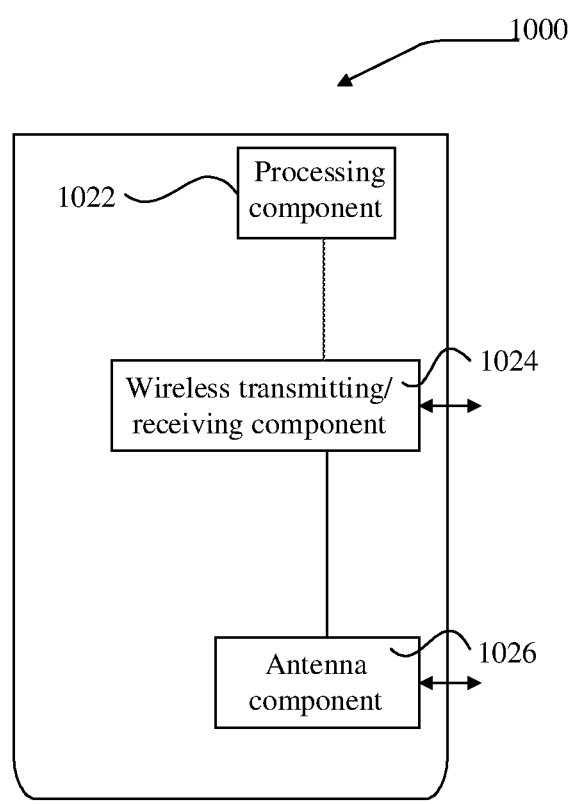
FIG. 10 is a block diagram of a device suitable for indicating correspondence according to an exemplary embodiment.

FIG. 10 is a block diagram of another device suitable for determining correspondence according to an exemplary embodiment. A device 1000 may be provided as a base station. Referring to FIG. 10, the device 1000 includes a processing component 1022, a wireless transmitting/receiving component 1024, an antenna component 1026, and a wireless interface-specific signal processing portion. The processing component 1022 may further include one or more processors.

One processor in the processing component 1022 may be configured to:
determine a beam to be sent;
generate indication information, the indication information including a number of beam groups and identifiers corresponding to beams in each beam group for sending an SSB, wherein an identifier corresponding to the beam to be sent is configured to indicate a correspondence between SSBs in a corresponding beam group and RMSI; and
send an SSB corresponding to the beam to be sent and the indication information to a UE.

In exemplary embodiments, there is also provided a non-transitory computer-readable storage medium including instructions. The instructions are executable by the processor 1022 of the device 1000 to complete the above described method for indicating correspondence. For example, the non-transitory computer-readable storage medium may be a ROM, a RAM, a CD-ROM, a magnetic tape, a floppy disc, an optical data storage device and the like.

For the device embodiments, the device embodiments substantially correspond to the method embodiments, and thus related parts refer to part of descriptions of the method embodiments. The device embodiments described above are only schematic. Units described as separate parts therein may or may not be physically separated. Parts displayed as units may or may not be physical units, and namely may be located in the same place or may also be distributed to a plurality of network units. Part or all of the modules therein may be selected according to a practical requirement to achieve the purpose of the solutions of the embodiments. Those of ordinary skill in the art may understand and implement without creative work.

It should be noted that relational terms "first", "second" and the like in the disclosure are adopted only to distinguish one entity or operation from another entity or operation, and not always to require or imply existence of any such practical relationship or sequence between the entities or operations. Terms "include" and "comprise" or any other variation thereof is intended to cover nonexclusive inclusions, such that a process, method, object or device including a series of elements not only includes those elements, but also includes other elements that are not clearly listed, or further includes elements intrinsic to the process, the method, the object or the device. Under the condition of no more limitations, an element defined by statement "including a/an" does not exclude existence of another element that is the same in a process, method, object or device including the element.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure only be limited by the appended claims.

What is claimed is:

1. A method for indicating correspondence, applied to a base station, the method comprising:
   determining a beam to be sent;
   generating indication information, the indication information comprising a number of beam groups and identifiers corresponding to beams in each beam group for sending a synchronization signal block (SSB), wherein an identifier corresponding to the beam to be sent is configured to indicate a correspondence between SSBs in a corresponding beam group and remaining minimum system information (RMSI); and
   sending an SSB corresponding to the beam to be sent and the indication information to user equipment (UE).

2. The method of claim 1, further comprising:
   grouping the beams according to the number of beam groups.

3. The method of claim 1, wherein an identifier corresponding to a beam, except the beam to be sent, in each beam group for sending the SSB is configured to indicate whether the corresponding beam is for sending the SSB.

4. The method of claim 1, wherein the indication information is carried in the RMSI.

5. A method for determining correspondence, applied to user equipment (UE), the method comprising:
   receiving a synchronization signal block (SSB) corresponding to a beam to be sent and indication information from a base station, the indication information comprising a number of beam groups and identifiers corresponding to beams in each beam group for sending the SSB, wherein an identifier corresponding to the beam to be sent is configured to indicate a correspondence between SSBs in a corresponding beam group and remaining minimum system information (RMSI);
   parsing a time indicator (TI) from the SSB, and determining a position of the SSB in a beam group to which the SSB belongs according to the TI and the number of beam groups; and
   acquiring an identifier corresponding to the beam to be sent according to the position, and determining the correspondence between SSBs in the corresponding beam group and RMSI according to the identifier corresponding to the beam to be sent.

6. The method of claim 5, wherein determining the correspondence between SSBs in the corresponding beam group and RMSI according to the identifier corresponding to the beam to be sent comprises:
   when the identifier corresponding to the beam to be sent is a first identifier, determining the correspondence between SSBs in the corresponding beam group and RMSI to be a one-to-one relationship; and
   when the identifier corresponding to the beam to be sent is a second identifier, determining the correspondence between SSBs in the corresponding beam group and RMSI to be a many-to-one relationship.

7. The method of claim 6, further comprising:
   receiving, for the beam group in which the correspondence between SSBs and RMSI is the one-to-one relationship, data at a position, except a position of the corresponding RMSI, in the SSB.

8. The method of claim 5, wherein an identifier corresponding to a beam, except the beam to be sent, in each beam group for sending the SSB is configured to indicate whether the corresponding beam is for sending the SSB.

9. The method of claim 5, wherein the indication information is carried in the RMSI.

10. User equipment (UE), comprising:
    a processor; and
    a memory configured to store instructions executable by the processor,
    wherein the processor is configured to:
    receive a synchronization signal block (SSB) corresponding to a beam to be sent and indication information from a base station, the indication information comprising a number of beam groups and identifiers corresponding to beams in each beam group for sending the SSB, wherein an identifier corresponding to the beam to be sent is configured to indicate a correspondence between SSBs in a corresponding beam group and remaining minimum system information (RMSI);
    parse a time indicator (TI) from the SSB, and determine a position of the SSB in a beam group to which the SSB belongs according to the TI and the number of beam groups; and
    acquire an identifier corresponding to the beam to be sent according to the position, and determine the correspondence between SSBs in the corresponding beam group and RMSI according to the identifier corresponding to the beam to be sent.

11. The UE of claim 10, wherein the processor is further configured to:
    determine, when the identifier corresponding to the beam to be sent is a first identifier, the correspondence between SSBs in the corresponding beam group and RMSI as a one-to-one relationship; and
    determine, when the identifier corresponding to the beam to be sent is a second identifier, the correspondence between SSBs in the corresponding beam group and RMSI as a many-to-one relationship.

12. The UE of claim 11, wherein the processor is further configured to:
    receive, for the beam group in which the correspondence between SSBs and RMSI is the one-to-one relationship, data at a position, except a position of the corresponding RMSI, in the SSB.

13. The UE of claim 10, wherein an identifier corresponding to a beam, except the beam to be sent, in each beam group for sending the SSB is configured to indicate whether the corresponding beam is for sending the SSB.

14. The UE of claim 10, wherein the indication information is carried in the RMSI.

* * * * *